Patented Aug. 26, 1952

2,608,517

UNITED STATES PATENT OFFICE 2,608,517

DEWAXING PROCESS USING FILTER AID

John L. Tiedje, Sarnia, Lambton, Ontario, Canada, assignor to Standard Oil Development Company, a corporation of Delaware No Drawing. Application March 4, 1950, Serial No. 147,774

2 Claims. (Cl. 196—19)

The present invention relates to the separation of waxy constituents from hydrocarbon oils, and more specifically to an improved method for effecting such separation more rapidly and completely than is possible by present known methods. The invention will be fully understood from the following description.

Hydrocarbon oils often contain solid waxy constituents which may be removed after dilution of the oil by chilling, which causes the wax to solidify, and by mechanical separation. The separation may be effected by settling, by filtration or by centrifugation, depending on the character of the waxy stock. In many instances the separation is slow and difficult.

It has been found that the separation of waxy constituents can be greatly improved by the use of certain substances which are termed "separation aids" but which are not to be confused with the bulky, earthly materials, such as clays and silica now used as filtration aids.

The present invention deals with the discovery of a new separation aid, specifically residual pitch from vacuum flash coil operation. This material is a petroleum product solid at ordinary temperatures and is obtained by the reduction of crude oil to a small percentage of bottoms by atmospheric and vacuum distillation. The residual pitch obtained by distilling a wax-bearing crude oil to approximately 10% bottoms may be used for this purpose but results in considerable color degradation of the dewaxed oil. However, if the wax bottoms, obtained by the vacuum distillation of the wax obtained when using this pitch as a filtering aid, are dissolved in hot dewaxing solvent and returned to the waxy oil feed in their original concentration an equivalent filter rate improvement can be achieved with no color degradation of the dewaxed oil. Hereinafter this improved material will be referred to as vacuum distilled wax bottoms.

These wax bottoms may be added in amounts between 0.05% and 0.5% but the best results are obtained by the use of 0.05%.

It will be understood that the waxy oil should be diluted in order to make the separation easier in the usual way, and as the diluent may be selected any one of a great many known materials. As examples of suitable diluents, the liquefied normally gaseous hydrocarbons may be mentioned, such as propane or butane or the corresponding olefins, used alone or admixed with each other or with ethane, ethylene or amylene and the like. Naphthas may also be used as well as liquid aromatic hydrocarbons such as benzol, toluol or xylol. Another class of diluents is the broad class of oxygen-containing liquid organic substances. These materials fall broadly within the class of the lower alcohols, ethers, esters, ketones, aldehydes and acids. Many of these substances are well known as wax precipitants and they may be used alone in some cases or preferably when admixed with solvents of the class of naphthas, liquid aromatic hydrocarbons or chlorinated hydrocarbons, such as carbon tetrachloride or trichlorethylene. Among the particular alcohols which are desirable may be mentioned ethyl, methyl, propyl and butyl alcohols, also amyl alcohol. The latter two of these may be used alone but it is preferable to use the former either with naphtha or a liquid aromatic hydrocarbon. Methyl or ethyl or methyl-ethyl esters or any of the other ethers corresponding to the above mentioned alcohols may be used. The esters which are most desirable are the formates or acetates; for example, methyl or ethyl formate, the propyl, butyl or amyl acetates. Acetones, di-ethyl and di-methyl or ethyl-methyl ketones may be used, and are preferably admixed with liquid aromatic hydrocarbons. It will be understood that these particular diluents are not new in the art but in each case there is believed to be an active cooperation between the diluent and the separation aid which makes a more rapid separation possible, together with a greater yield of oil and a better quality of wax.

The amount of the diluent used varies with the particular one employed, but in general they are used in proportions of from 1 to 4 volumes of the diluent or solvent to 1 volume of the waxy oil.

The diluted waxy oil mixture to which the separation aid is added is cooled to solidify the wax and the rate of chilling may be slow, as is now the practice, but it is found that the rate may be greatly increased when the separation aid is present; for example, it may be as rapid as 3° F./min. and still produce a readily separable wax.

The mechanical method of separation is either filtration, gravity separation or separation by means of centrifuge. The particular method of separation to be selected usually depends on the quality of the wax. Those of good crystal structure are usually to be filtered, while those of less clearly defined structure are preferably separated either by gravity settling or by centrifuge. However, it has been found that the effect of the separation aids is to cause all types of waxes to be more readily separated by any of the particular methods than could be accomplished without the aid. While the preferred mode of separation depends primarily on the particular type of waxy stock, it also depends on the diluent selected and in some cases cold settling of centrifugation is decidedly preferable to filtration. On the other hand, some of the solvents or diluents have a density which is substantially the same as that of the wax and in such cases separation by gravity or by the centrifuge is slow indeed, and in these cases filtration is preferred.

To illustrate the effect of the separation aid of the present invention, laboratory filtration experiments were carried out on a waxy, phenol-treated lubricating oil distillate having a viscosity at 100° F. of 115 Saybolt seconds Universal and a dry wax content of 17%. At a 3 to 1 dilution with methyl normal propyl ketone chilled to 0° F. at a rate of 3° F. per minute, this waxy distillate was dewaxed without any filter aid, with 0.05% pitch from Mid-Continent crude (10% bottoms) and with the bottoms obtained by the vacuum distillation of the wax obtained using the pitch as the separation aid. The following data illustrate the improved results obtained by the use of the separation aid of the present invention:

Table

[Phenol treated waxy distillate 41 S. S. U. viscosity @ 210, 17% dry wax content, dewaxed at 0° F.]

| | (1) | | (2) | | (3) | | (4) | | (5) | | (6) | |
|---|---|---|---|---|---|---|---|---|---|---|---|---|
| | Waxy Distillate | | Waxy Distillate plus pitch | | | | | | | | Waxy Distillate + wax bottoms from (3) | |
| | | | 0.01% | | 0.05% | | 0.10% | | 0.5% | | | |
| | Time, sec. | Volume, cc. | Time, sec. | Volume, cc. | Time, sec. | Volume, cc. | Time, sec. | Volume, cc. | Time, sec. | Volume, cc. | Time, sec. | Volume, cc. |
| | 28 | 178 | 32 | 177 | 17 | 175 | 23 | 180 | 23 | 216 | 18 | 186 |
| | 25 | 178 | 30 | 176 | 20 | 174 | 21.5 | 170 | 24 | 210 | 17 | 180 |
| | 25 | 187 | 35 | 170 | 15 | 170 | | | 27 | 177 | | |
| Average Time, seconds | 26 | | 32 | | 17 | | 22 | | 24 | | 17.5 | |
| Vol., cc | 181 | | 174 | | 173 | | 175 | | 200 | | 183 | |
| cc/sec | 7.0 | | 5.5 | | 10.2 | | 7.85 | | 8.35 | | 10.5 | |
| Dewaxed Oil Color, Tag Rob | 18¾ | | 13¼ | | 6¾ | | 3½ | | (too dark) | | 10 | |

From the above table it will be seen that the addition of 0.05% pitch either with or without vacuum distillation increased the filter rate. However, the original pitch caused the color of the final wax to be darker than the wax obtained in the absence of a filter aid. On the other hand, the wax obtained when using the vacuum-distilled bottoms showed substantially no color change.

The nature and objects of the present invention having been thus fully set forth and specific examples given, what is claimed as new and useful and desired to be secured by Letters Patent is:

1. An improved method for separating waxy constituents from oils, comprising diluting the waxy oil, adding a small quantity of pitch from a waxy crude, chilling to solidify the wax, separating the solidified wax from the diluted oil, vacuum distilling the separated wax to obtain a wax bottoms, adding these wax bottoms to a second batch of diluted waxy oil, chilling to solidify the wax and separating the solidified wax from the diluted oil.

2. In a process for dewaxing a wax-containing oil involving separation of wax from oil, the steps which comprise diluting the oil with a solvent, incorporating with the diluted oil a residual pitch obtained by distilling a wax-bearing oil to 10% bottoms, chilling the diluted oil to cause solidification of wax, separating the solidified wax from the diluted oil subjecting the solidified wax to vacuum distillation to obtain a small percentage of bottoms, and incorporating these bottoms in a second batch of diluted oil, whereby upon chilling to wax solidification temperature the wax is rendered more easily separable from the oil without color degradation.

JOHN L. TIEDJE.

REFERENCES CITED

The following references are of record in the file of this patent:

UNITED STATES PATENTS

| Number | Name | Date |
|---|---|---|
| 1,857,404 | Schott | May 10, 1932 |
| 1,927,057 | Anderson | Sept. 19, 1933 |
| 2,031,108 | Hopper | Feb. 18, 1936 |
| 2,106,969 | Davis | Feb. 1, 1938 |